United States Patent
Dhanapal et al.

(10) Patent No.: US 10,111,276 B2
(45) Date of Patent: Oct. 23, 2018

(54) TECHNIQUES FOR POWER SAVINGS IN MULTI-SIM MODEMS USING EXTENDED LTE SIGNALING

(71) Applicant: QUALCOMM Incorporated, San Diego, CA (US)

(72) Inventors: Muthukumaran Dhanapal, San Diego, CA (US); Shravan Kumar Raghunathan, San Diego, CA (US); Parthasarathy Krishnamoorthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 15/272,308

(22) Filed: Sep. 21, 2016

(65) Prior Publication Data
US 2018/0084601 A1    Mar. 22, 2018

(51) Int. Cl.
*H04B 1/3818* (2015.01)
*H04W 76/38* (2018.01)
(Continued)

(52) U.S. Cl.
CPC .......... *H04W 76/27* (2018.02); *H04B 1/3818* (2015.01); *H04W 52/0212* (2013.01);
(Continued)

(58) Field of Classification Search
CPC ........... H04W 76/046; H04W 52/0212; H04W 56/001; H04W 76/068; H04W 80/02;
(Continued)

(56) References Cited

U.S. PATENT DOCUMENTS

| 8,369,290 B2 | 2/2013 | Xing et al. |
| 9,167,592 B1 | 10/2015 | Hsu et al. |

(Continued)

FOREIGN PATENT DOCUMENTS

| EP | 1 981 224 A1 | 10/2008 |
| WO | WO-2013/185031 A1 | 12/2013 |
| WO | WO-2016/015003 A1 | 1/2016 |

OTHER PUBLICATIONS

International Search Report and Written Opinion—PCT/US2017/043776—ISA/EPO—dated Nov. 7, 2017. (17 total pages).
(Continued)

*Primary Examiner* — Kashif Siddiqui
(74) *Attorney, Agent, or Firm* — Dalei Dong; Arent Fox

(57) ABSTRACT

Aspects of the present disclosure generally relate to wireless communications. A method and apparatus described include detecting a connection event after completing a Radio Resource Control (RRC) connection reconfiguration procedure with a base station. The method and apparatus include transmitting a connection release request message on a signaling radio bearer (SRB) to the base station in response to detecting the connection event. The method and apparatus include initiating a connection release timer in response to detecting the connection event. The method and apparatus include monitoring for a synchronization message from the base station. The method and apparatus include performing a first connection procedure to synchronize with the base station based on receiving the synchronization message from the base station prior to an expiration of the connection release timer.

30 Claims, 11 Drawing Sheets

(51) Int. Cl.
*H04W 56/00* (2009.01)
*H04W 76/27* (2018.01)
*H04W 52/02* (2009.01)
*H04W 76/30* (2018.01)
*H04W 88/02* (2009.01)
*H04W 84/04* (2009.01)
*H04W 80/02* (2009.01)
*H04W 88/06* (2009.01)

(52) U.S. Cl.
CPC ......... *H04W 56/001* (2013.01); *H04W 76/30* (2018.02); *H04W 76/38* (2018.02); *H04W 52/0225* (2013.01); *H04W 80/02* (2013.01); *H04W 84/042* (2013.01); *H04W 88/02* (2013.01); *H04W 88/06* (2013.01)

(58) Field of Classification Search
CPC ... H04W 84/042; H04W 88/02; H04B 1/3818
See application file for complete search history.

(56) References Cited

U.S. PATENT DOCUMENTS

| | | | | |
|---|---|---|---|---|
| 2005/0281269 | A1* | 12/2005 | Choi | H04W 76/32 370/395.2 |
| 2008/0253312 | A1* | 10/2008 | Park | H04W 76/046 370/311 |
| 2009/0028084 | A1* | 1/2009 | Ping | H04W 52/0251 370/311 |
| 2013/0242730 | A1* | 9/2013 | Pelletier | H04W 28/0284 370/230 |
| 2014/0119224 | A1* | 5/2014 | Keskitalo | H04W 24/10 370/252 |
| 2014/0269637 | A1* | 9/2014 | Banister | H04L 5/0078 370/336 |
| 2015/0382396 | A1* | 12/2015 | Bhat | H04W 76/028 370/331 |
| 2016/0095159 | A1 | 3/2016 | Su | |
| 2016/0142998 | A1 | 5/2016 | Tsai et al. | |
| 2016/0249408 | A1* | 8/2016 | Thiruvenkatachari | H04W 60/005 |
| 2016/0345351 | A1* | 11/2016 | Bhattacharjee | H04W 48/18 |

OTHER PUBLICATIONS

Qualcomm Inc: "Avoid UEs Staying in RRC Connected State Unnecessarily", 3GPP Draft; DISCUSSIONPAPER_RRC_RELEASE_R2-165676, 3rd Generation Partnership Project (3GPP), Mobile Competence Centre, 650, Route Des Lucioles, F-06921, Sophia-Antipolis Cedex, France, vol. RAN WG2, No. Goteborg; Aug. 13, 2016, XP051134009, Retrieved from the Internet: URL:http://www.3gpp.org/ftp/tsg_ran/WG2_RL2/TSGR2_95/Docs/ [retrieved on Aug. 13, 2016], 2 pages.

* cited by examiner

TECHNIQUES FOR POWER SAVINGS IN MULTI-SIM MODEMS USING EXTENDED LTE SIGNALING

FIELD OF DISCLOSURE

Aspects of the present disclosure generally relate to wireless communications, and more particularly to techniques for performing a connection release procedure in order to synchronize a UE and a base station and to prevent battery draining.

DESCRIPTION OF RELATED ART

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

For example, during wireless communications with a network on a first Radio Access Technology (RAT), a UE may perform a Long Tune Away procedure to another RAT. In certain instances, the network may miss the Connection Release message transmitted by the UE. As a result, the network and UE may become out-of-synchronization since the network will enter into an idle state even though the UE remains in a Radio Resource Control (RRC) Connected state. In turn, the out-of-synchronization between the network and the UE causes the UE to unnecessarily drain the battery as it remains in the RRC Connected state. Thus, improvements in performing a connection release procedure in order to synchronize a UE and a base station and to prevent battery draining during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method for wireless communication may include detecting a connection event after completing a Radio Resource Control (RRC) connection reconfiguration procedure with a base station. The described aspects further include transmitting a connection release request message on a signaling radio bearer (SRB) to the base station in response to detecting the connection event. The described aspects further include initiating a connection release timer in response to detecting the connection event. The described aspects further include monitoring for a synchronization message from the base station. The described aspects further include performing a first connection procedure to synchronize with the base station based on receiving the synchronization message from the base station prior to an expiration of the connection release timer.

In another aspect, an apparatus for wireless communication may include a memory; and a processor coupled to the memory and configured to detect a connection event after completing a RRC connection reconfiguration procedure with a base station. The described aspects further transmit a connection release request message on a signaling radio bearer SRB to the base station in response to detecting the connection event. The described aspects further initiate a connection release timer in response to detecting the connection event. The described aspects further monitor for a synchronization message from the base station. The described aspects further perform a first connection procedure to synchronize with the base station based on receiving the synchronization message from the base station prior to an expiration of the connection release timer.

In another aspect, a computer-readable medium may store computer executable code for wireless communication. The described aspects include code for detecting a connection event after completing a RRC connection reconfiguration procedure with a base station. The described aspects further include code for transmitting a connection release request message on a SRB to the base station in response to detecting the connection event. The described aspects further include code for initiating a connection release timer in response to detecting the connection event. The described aspects further include code for monitoring for a synchronization message from the base station. The described aspects further include code for performing a first connection procedure to synchronize with the base station based on receiving the synchronization message from the base station prior to an expiration of the connection release timer.

In another aspect, an apparatus for wireless communication may include means for detecting a connection event after completing a RRC connection reconfiguration procedure with a base station. The described aspects further include means for transmitting a connection release request message on a SRB to the base station in response to detecting the connection event. The described aspects further include means for initiating a connection release timer in response to detecting the connection event. The described aspects further include means for monitoring for a synchronization message from the base station. The described aspects further include means for performing a first connection procedure to synchronize with the base station based on receiving the synchronization message from the base station prior to an expiration of the connection release timer.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
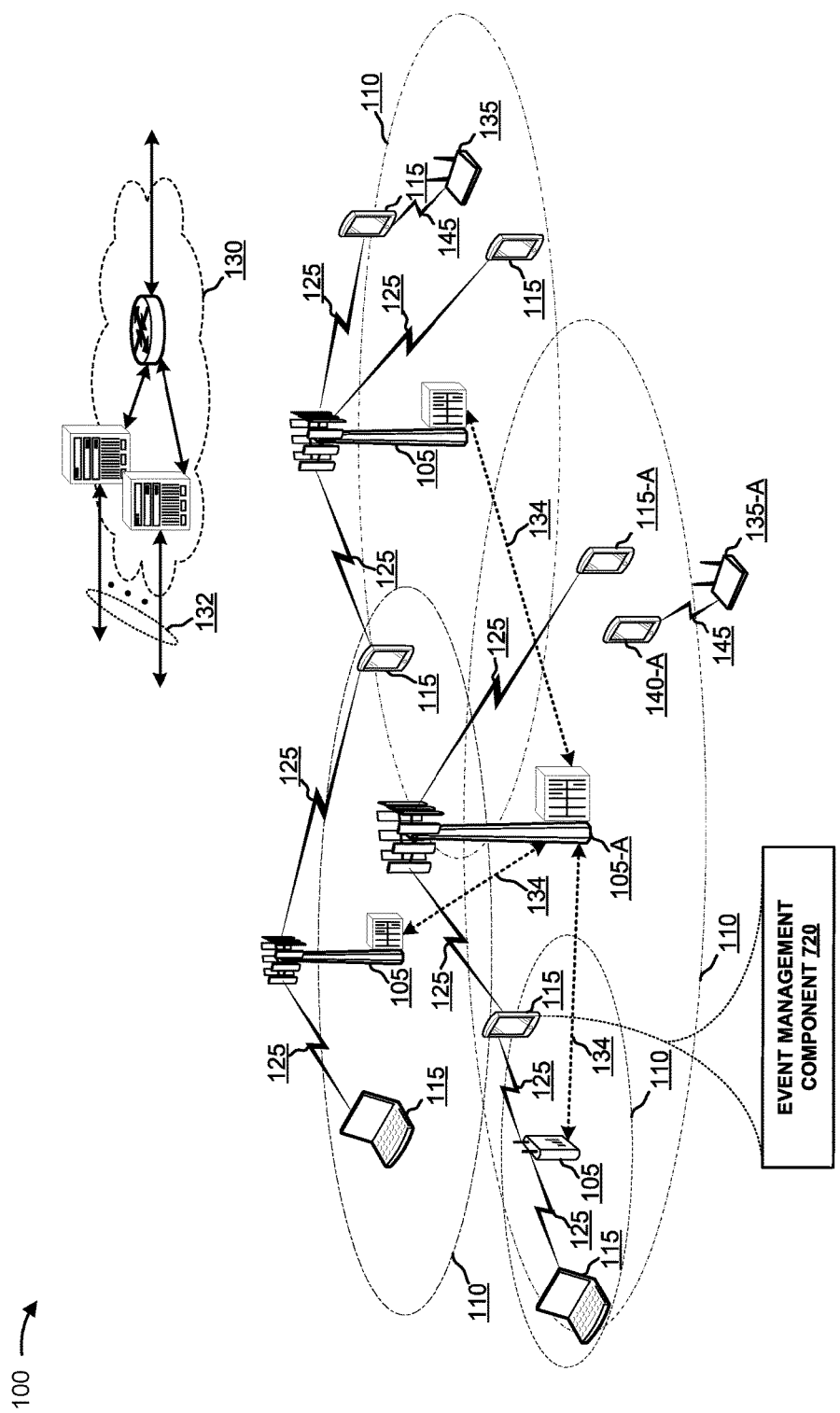
FIG. 1 is an illustration of an example wireless communication system, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects are generally related to performing a connection release procedure in order to synchronize a UE and a base station and to prevent battery draining. For example, some UEs having multi-subscriber identity module (MSIM) features may perform long tune away procedures to other radio access technologies (RATs) which may result in the UE missing or failing to receive an over-to-air connection release message on an Long Term Evolution (LTE) subscription. This may cause a lack of synchronization between the UE and a base station (e.g., eNodeB) as the base station may transition to idle state while the UE continues to operate in a RRC connected state, thereby resulting in excessive UE battery drain. As such, it may be desirable to address at least the foregoing power consumption issue by using Extended LTE Signaling (ELS) and enhance the overall performance of the UE having the MSIM. ELS corresponds to a hand shake signaling mechanism outside of TS36.331 in which the network indicates a special signature as part of SIB (e.g., such as SIB1) padding information. The UE will snoop through this padding information and convey an acknowledgement to the network indicating that the UE is ELS capable. Once the handshake/discovery procedure is complete the network and the UE may follow new signaling procedures/logical channel instead of 36.331 signaling procedures. As such, this disclosure describes various techniques for power savings in MSIM modems by using extended LTE signaling.

Accordingly, in some aspects, the present methods and apparatuses may provide an efficient solution, as compared to current solutions, by using the ELS framework, initiating a Connection Release Request sent on a SRB, and depending on the base station response, the UE may perform an RRC Connection Release to synchronize with the base station and prevent battery drain. For example, the UE may initiate the Connection Release Request as a result of the out-of-synchronization between the network and the UE. Unlike current solutions, which do not address the instances in which the network may miss the Connection Release message previously transmitted by the UE, the present methods and apparatuses detect that the UE became out-of-synchronization with the network. Since the UE is able to recognize that it has become out-of-synchronization with the network, the UE may prevent drainage of the battery by unnecessarily transmitting signals to a network that is in idle state. As such, the present aspects provide one or more mechanisms for detecting a connection event after completing a RRC connection reconfiguration procedure with a base station. Furthermore, the present aspects provide one or more mechanisms that include transmitting a connection release request message on a SRB to the base station, and initiating a connection release timer in response to detecting the connection event. The present aspects provide one or more further mechanisms for monitoring for a synchronization message from the base station, and performing a first connection procedure to synchronize with the base station based on receiving the synchronization message from the base station prior to an expiration of the connection release timer. As a result of performing the first connection procedure and synchronizing with the base station, the network may return from the idle state. Thus, the UE will not drain the battery by unnecessarily remaining in connection with an out-of-synchronization base station in idle state.

The techniques described herein may be used for one or more of various wireless communication networks, such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT), such as universal terrestrial radio access (UTRA), CDMA2000, or the like. UTRA may include wideband CDMA (WCDMA) and/or other variants of CDMA. CDMA2000 may include Interim Standard (IS)-2000, IS-95 and IS-856 standards. IS-2000 may also be referred to as 1x radio transmission technology (1xRTT), CDMA2000 1x, or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

FIG. 1 is an illustration of an example wireless communication system 100, in accordance with various aspects of the disclosure. The wireless communication system 100 may include a WWAN network, such as a cellular network, and a WLAN network, such as a Wi-Fi network. The cellular network may include one or more base stations 105, 105-A, one or more UEs 115, 115-A, including event management component 720, which may be configured for performing a connection release procedure in order to synchronize a UE and a base station and to prevent battery draining, and a core network 130. In some aspects, the event management component 720 enables and/or performs techniques for power savings in MSIM modems by using extended LTE signaling in the example of wireless communication system 100. The Wi-Fi network may include one or more WLAN access points 135, 135-A (e.g., Wi-Fi access points) and one or more WLAN stations 140, 140-A (e.g., Wi-Fi stations).

With reference to the cellular network of the wireless communication system 100, the core network 130 may provide user authentication, access authorization, tracking, Internet Protocol (IP) connectivity, and other access, routing, or mobility functions. The base stations 105, 105-A may interface with the core network 130 through backhaul links 132 (e.g., S1, etc.) and may perform radio configuration and scheduling for communication with the UEs 115, 115-A, or may operate under the control of a base station controller (not shown). In various examples, the base stations 105, 105-A may communicate, either directly or indirectly (e.g., through core network 130), with each other over backhaul links 134 (e.g., X2, etc.), which may be wired or wireless communication links.

The base stations 105, 105-A may wirelessly communicate with the UEs 115, 115-A via one or more base station antennas. Each of the base station 105, 105-A sites may provide communication coverage for a respective geographic coverage area 110. In some examples, a base station 105, 105-A may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-A may be divided into sectors making up a portion of the coverage area (not shown). The cellular network may include base stations 105, 105-A of different types (e.g., macro and/or small cell base stations). There may be overlapping geographic coverage areas 110 for different technologies.

In some examples, the cellular network may include an LTE/LTE-A network. In LTE/LTE-A networks, the term evolved Node B (eNB) may be used to describe the base stations 105, 105-A, while the term UE may be used to describe the UEs 115, 115-A. The cellular network may be a Heterogeneous LTE/LTE-A network in which different types of eNBs provide coverage for various geographical regions. For example, each eNB or base station 105, 105-A may provide communication coverage for a macro cell, a small cell, and/or another type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, or the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115, 115-A and the base stations 105, 105-A or core network 130 supporting radio bearers for the user plane data. At the Physical (PHY) layer, the transport channels may be mapped to Physical channels.

The UEs 115, 115-A may be dispersed throughout the wireless communication system 100, and each UE 115, 115-A may be stationary or mobile. A UE 115, 115-A may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115, 115-A may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-A and network equipment, including macro eNBs, small cell eNBs, relay base stations, or the like.

The communication links 125 shown in wireless communication system 100 may carry downlink (DL) transmissions from a base station 105, 105-A to a UE 115, 115-A, and/or uplink (UL) transmissions from a UE 115, 115-A to a base station 105, 105-A. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105, 105-A and/or UEs 115, 115-A may include multiple antennas for employing antenna diversity schemes to improve communication quality and reliability between base stations 105, 105-A and UEs 115, 115-A. Additionally or alternatively, base stations 105, 105-A and/or UEs 115, 115-A may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115, 115-A may be configured with multiple downlink CCs and one or more uplink CCs for carrier aggregation. Carrier aggregation may be used with both FDD and TDD component carriers.

With reference to the Wi-Fi network of the wireless communication system 100, the WLAN access points 135, 135-A may wirelessly communicate with the WLAN stations 140, 140-A via one or more WLAN access point antennas, over one or more communication links 145. In some examples, the WLAN access points 135, 135-A may communicate with the WLAN stations 140, 140-A using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac).

In some examples, a WLAN station 140, 140-A may be a cellular phone, a personal digital assistant (PDA), a wireless communication device, a handheld device, a tablet computer, a laptop computer, or the like. In some examples, an apparatus may include aspects of both a UE 115, 115-A and a WLAN station 140, 140-A, and such an apparatus may communicate with one or more base stations 105, 105-A using a first radio access technology (RAT) (e.g., a cellular RAT or multiple cellular RATs), and communicate with one or more WLAN access points 135, 135-A using a second RAT (e.g., a Wi-Fi RAT or multiple Wi-Fi RATs).

In some examples, the base stations 105, 105-A and UEs 115, 115-A may communicate over a licensed radio frequency spectrum band and/or an unlicensed radio frequency spectrum band, whereas the WLAN access points 135, 135-A and WLAN stations 140, 140-A may communicate over the unlicensed radio frequency spectrum band. The unlicensed radio frequency spectrum band may therefore be shared by the base stations 105, 105-A, the UEs 115, 115-A, the WLAN access points 135, 135-A, and/or the WLAN stations 140, 140-A.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2:
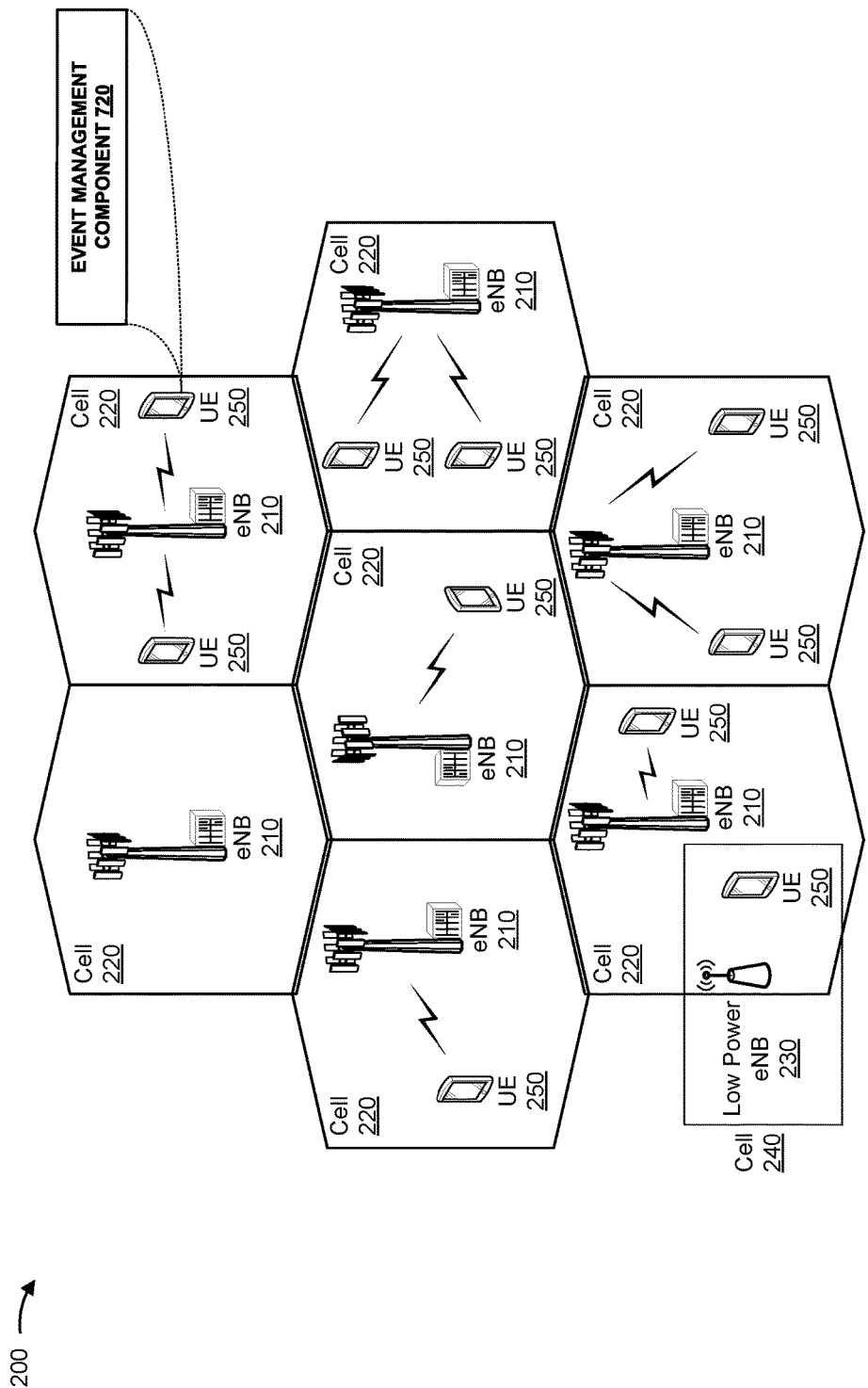
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include a set of eNBs 210 that serve a corresponding set of cellular regions (cells) 220, a set of low power eNBs 230 that serve a corresponding set of cells 240, and a set of UEs 250, including event management component 720, which may be configured for performing a connection release procedure in order to synchronize a UE and a base station and to prevent battery draining. In some aspects, the event management component 720 enables and/or performs techniques for power savings in MSIM modems by using extended LTE signaling in the example of access network 200.

Each eNB 210 may be assigned to a respective cell 220 and may be configured to provide an access point to a RAN. For example, eNB 210 may provide an access point for UE 250 to a RAN (e.g., eNB 210 may correspond to base station 105, shown in FIG. 1). UE 250 may correspond to UE 115, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity.

As shown in FIG. 2, one or more low power eNBs 230 may serve respective cells 240, which may overlap with one or more cells 220 served by eNBs 210. The low power eNBs 230 may correspond to base station 105, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, or the like), UMB, IEEE 802.11 (Wi-Fi), IEEE 802.16 (WiMAX), IEEE 802.20, Flash-OFDM employing OFDMA, or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
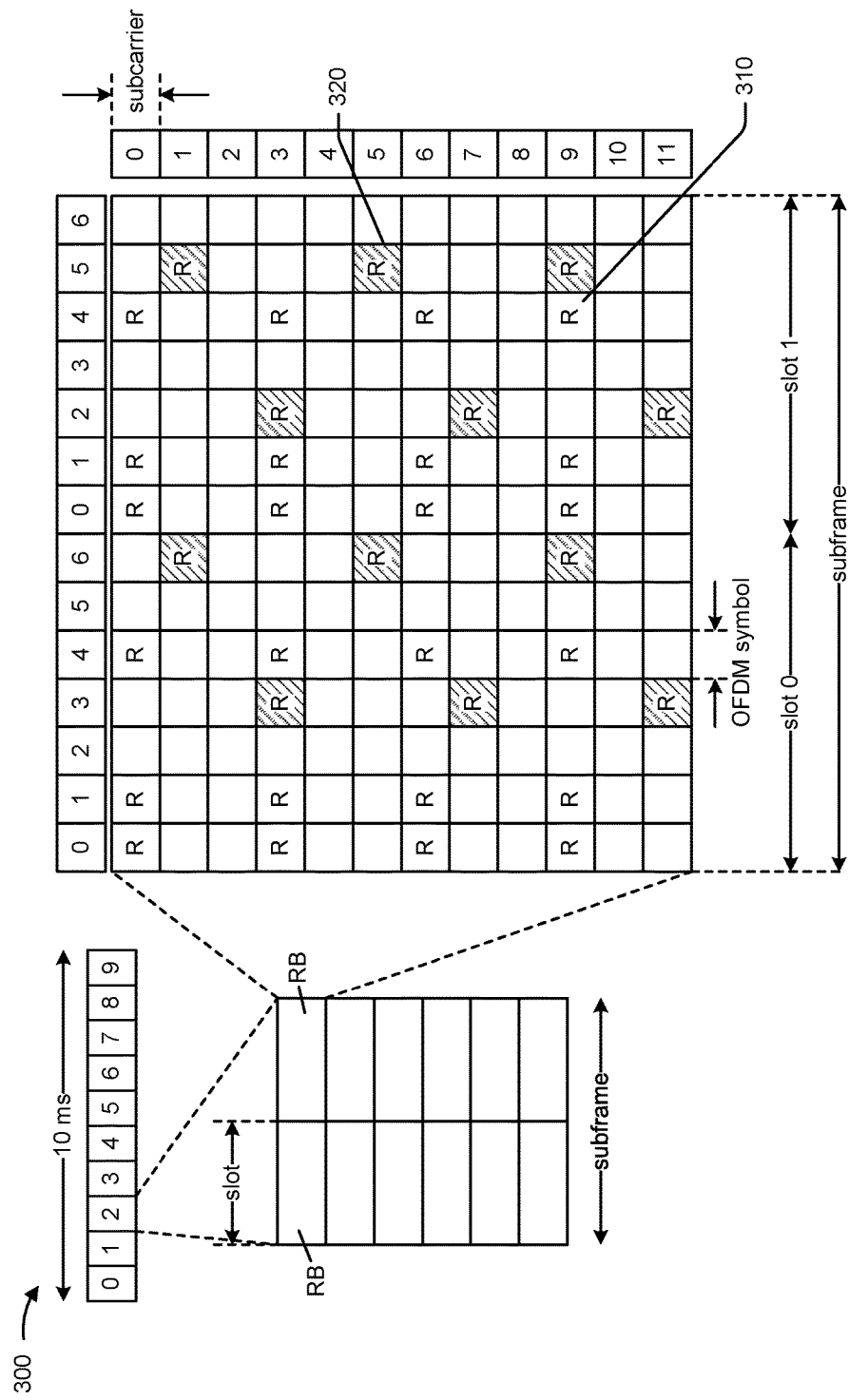
FIG. 3 is a diagram illustrating an example of a downlink (DL) frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search. The UE may correspond to one or more UEs, such as UE 115 (FIGS. 1 and 7), including event management component 720, which may be configured for performing a connection release procedure in order to synchronize a UE and a base station and to prevent battery draining, and a core network 130. In some aspects, the event management component 720 enables and/or performs techniques for power savings in MSIM modems by using extended LTE signaling in the example of wireless communication system 100.

As indicated above, FIG. 3 is provided as an example. Other examples are possible and may differ from what was described above in connection with FIG. 3.

Figure 4:
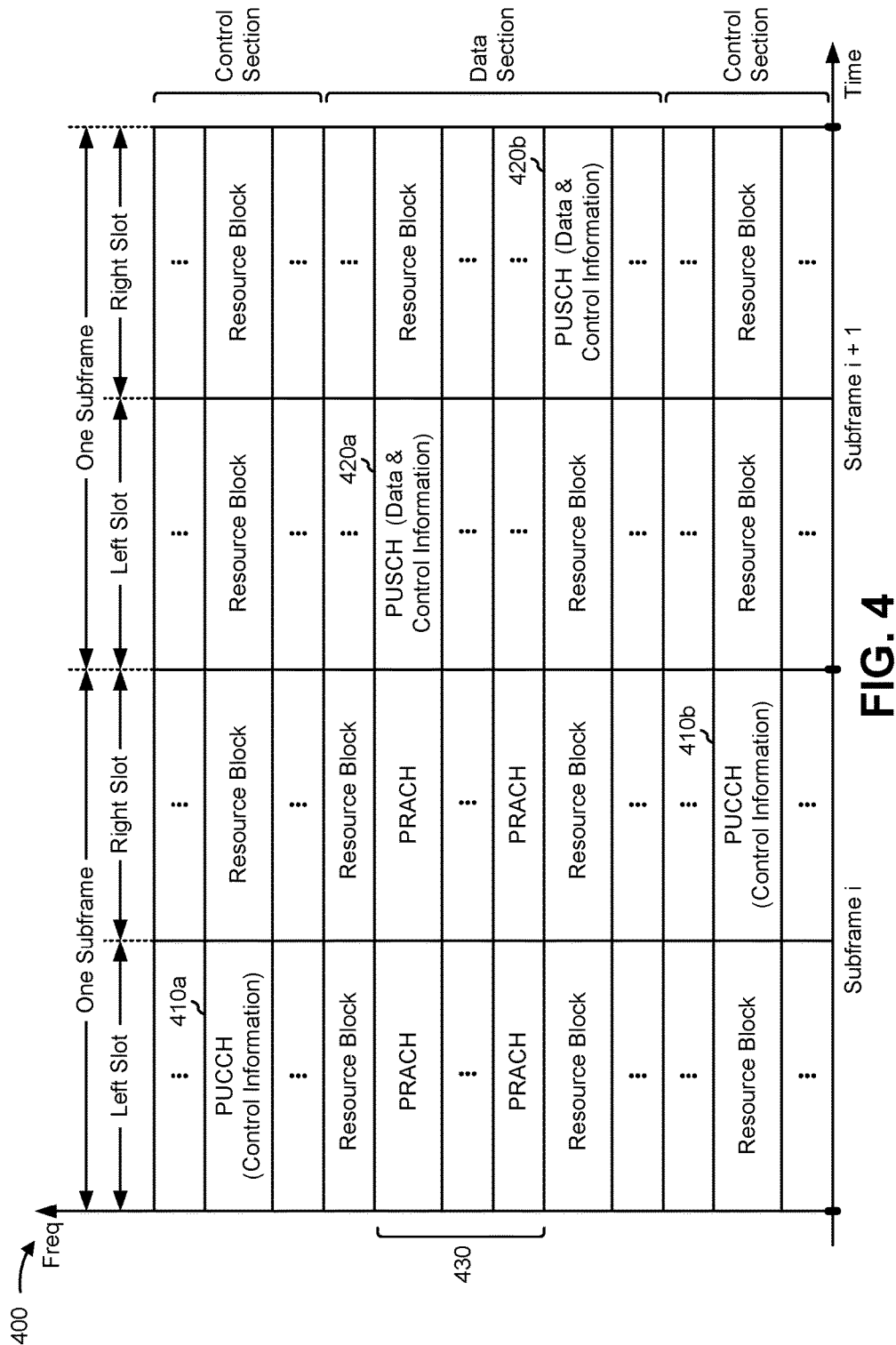
FIG. 4 is a diagram illustrating an example of an uplink (UL) frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section. The UE may correspond to one or more UEs, such as UE 115 (FIGS. 1 and 7), including event management component 720, which may be configured for performing a connection release procedure in order to synchronize a UE and a base station and to prevent battery draining, and a core network 130. In some aspects, the event management component 720 enables and/or performs techniques for power savings in MSIM modems by using extended LTE signaling in the example of wireless communication system 100.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. In some aspects, the UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes.

As indicated above, FIG. 4 is provided as an example. Other examples are possible and may differ from what was described above in connection with FIG. 4.

Figure 5:
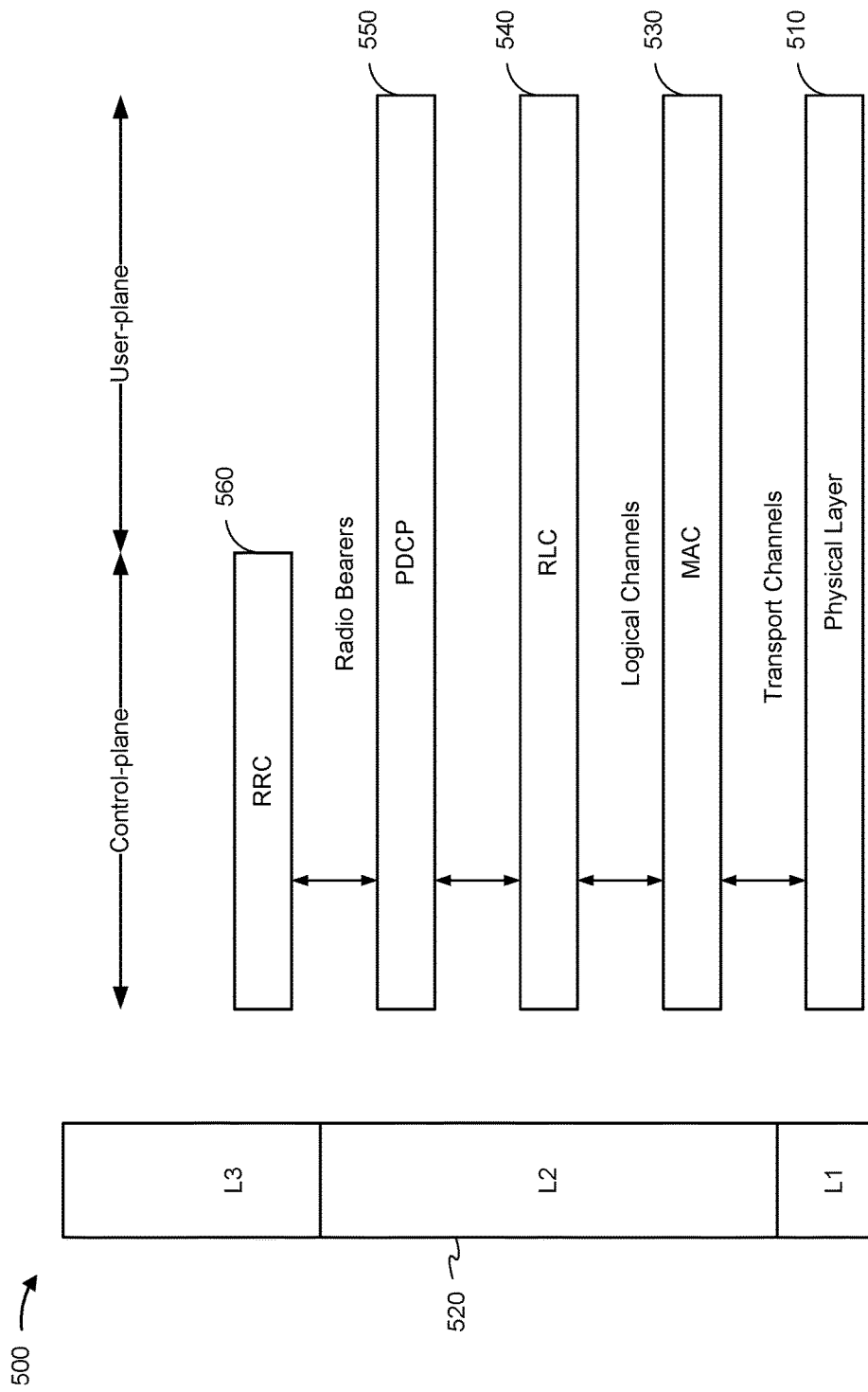
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510. The UE may correspond to one or more UEs, such as UE 115 (FIGS. 1 and 7), including event management component 720, which may be configured for performing a connection release procedure in order to synchronize a UE and a base station and to prevent battery draining, and a core network 130. In some aspects, the event management component 720 enables and/or performs techniques for power savings in MSIM modems by using extended LTE signaling in the example of wireless communication system 100.

In the user plane, the L2 layer 520 includes a media access control (MAC) sublayer 530, a radio link control (RLC) sublayer 540, and a packet data convergence protocol (PDCP) 550 sublayer, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, etc.).

The PDCP sublayer 550 provides multiplexing between different radio bearers and logical channels. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. In some aspects, integrity protection may be provided for the control plane data. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
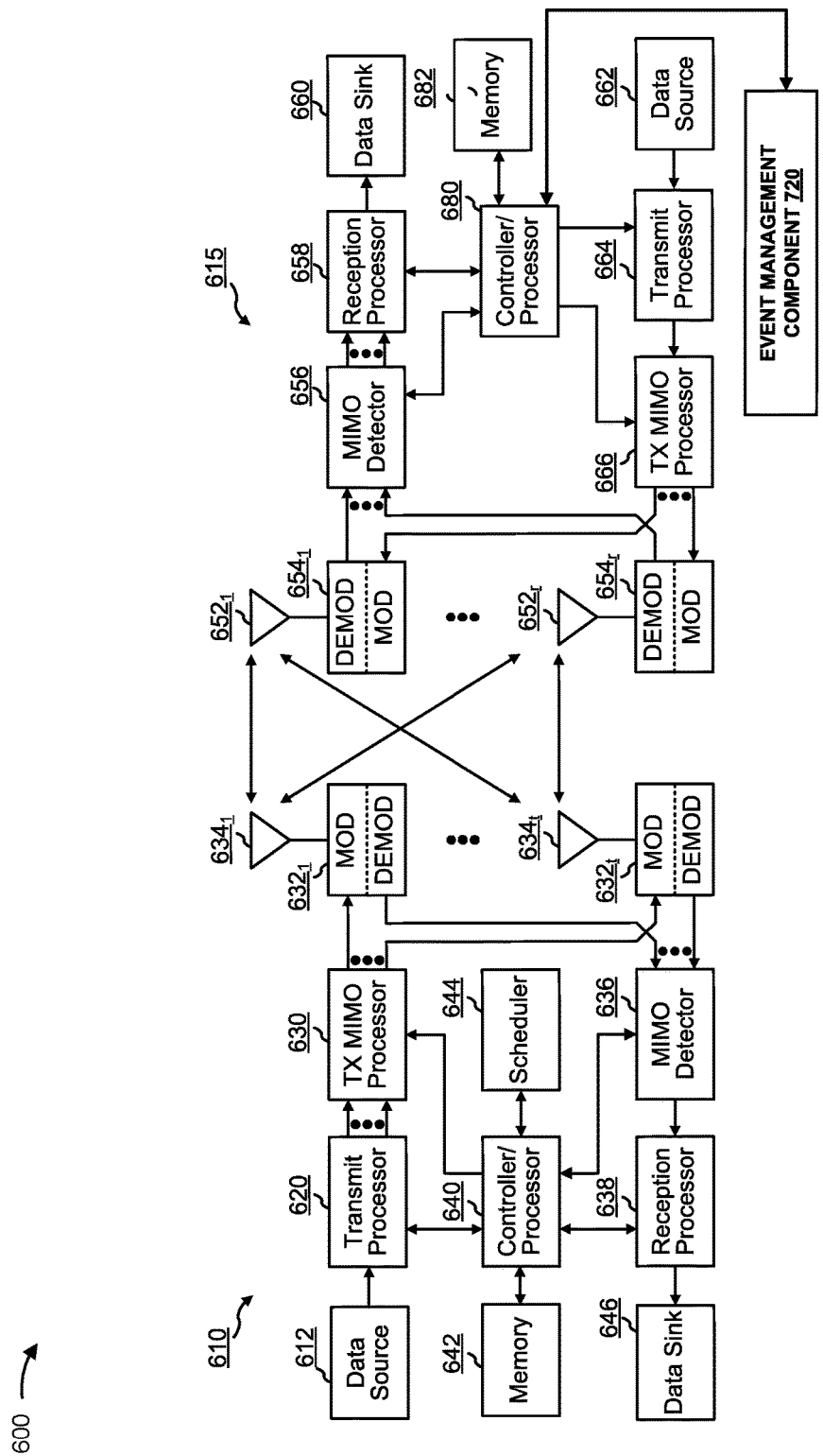
FIG. 6 is a block diagram illustrating example components of a communication system including a base station and a UE, in accordance with various aspects of the present disclosure.

FIG. 6 is an illustration of example components of a communication system 600 including a base station 610 and a UE 615, in accordance with various aspects of the present disclosure. In some aspects, base station 610 may correspond to one or more of the base stations and/or eNBs 105, 105-A, 210, or 230 described with reference to FIG. 1 or 2. In some aspects, UE 615 may correspond to one or more of the UEs 115, 115-A, or 250 described above with reference to FIG. 1, 2, or 7. Base station 610 may be equipped with antennas $634_{1-t}$, and UE 615 may be equipped with antennas $652_{1-r}$, wherein t and r are integers greater than or equal to one.

At base station 610, a base station transmit processor 620 may receive data from a base station data source 612 and control information from a base station controller/processor 640. The control information may be carried on the Physical Broadcast Channel (PBCH), the Physical Control Format Indicator Channel (PCFICH), the Physical Hybrid-ARQ Indicator Channel (PHICH), the Physical Downlink Control Channel (PDCCH), or the like. The data may be carried on the Physical Downlink Shared Channel (PDSCH), for example. Base station transmit processor 620 may process (e.g., encode and symbol map) the data and control information to obtain data symbols and control symbols, respectively. Base station transmit processor 620 may also generate reference symbols, e.g., for the PSS, SSS, and cell-specific reference signal (RS). A base station transmit (TX) multiple-input multiple-output (MIMO) processor 630 may perform spatial processing (e.g., precoding) on the data symbols, the control symbols, and/or the reference symbols, if applicable, and may provide output symbol streams to base station modulators/demodulators (MODs/DEMODs) $632_{1-t}$. Each base station modulator/demodulator 632 may process a respective output symbol stream (e.g., for orthogonal frequency-division multiplexing (OFDM), or the like) to obtain an output sample stream. Each base station modulator/demodulator 632 may further process (e.g., convert to analog, amplify, filter, and upconvert) the output sample stream to obtain a downlink signal. Downlink signals from modulators/demodulators $632_{1-t}$ may be transmitted via antennas $634_{1-t}$, respectively.

At UE 615, UE antennas $652_{1-r}$ may receive the downlink signals from base station 610 and may provide received signals to UE modulators/demodulators (MODs/DEMODs) $654_{1-r}$, respectively. Each UE modulator/demodulator 654 may condition (e.g., filter, amplify, downconvert, and digitize) a respective received signal to obtain input samples. Each UE modulator/demodulator 654 may further process the input samples (e.g., for OFDM, etc.) to obtain received symbols. A UE MIMO detector 656 may obtain received symbols from all UE modulators/demodulators $654_{1-r}$, and perform MIMO detection on the received symbols, if applicable, and provide detected symbols. A UE reception processor 658 may process (e.g., demodulate, deinterleave, and decode) the detected symbols, provide decoded data for UE 615 to a UE data sink 660, and provide decoded control information to a UE controller/processor 680.

On the uplink, at UE 615, a UE transmit processor 664 may receive and process data (e.g., for the Physical Uplink Shared Channel (PUSCH)) from a UE data source 662 and control information (e.g., for the Physical Uplink Control Channel (PUCCH)) from UE controller/processor 680. UE transmit processor 664 may also generate reference symbols for a reference signal. The symbols from UE transmit processor 664 may be precoded by a UE TX MIMO processor 666, if applicable, may be further processed by UE modulator/demodulators $654_{1-r}$ (e.g., for SC-FDM, etc.), and may be transmitted to base station 610. At base station 610, the uplink signals from UE 615 may be received by base station antennas 634, processed by base station modulators/demodulators 632, detected by a base station MIMO detector 636, if applicable, and further processed by a base station reception processor 638 to obtain decoded data and control information sent by UE 615. Base station reception processor 638 may provide the decoded data to a base station data sink 646 and the decoded control information to base station controller/processor 640.

Base station controller/processor 640 and UE controller/processor 680 may direct the operation at base station 610 and UE 615, respectively. Base station controller/processor 640 and/or other processors and modules at base station 610 may perform or direct, for example, execution of various processes for the techniques described herein. UE controller/processor 680 and/or other processors and modules at UE 615 may also perform or direct, for example, execution of one or more blocks illustrated in FIG. 9, and/or other processes for the techniques described herein. For example, UE controller/processor 680 and/or event management component 720 may be configured for performing a connection release procedure in order to synchronize a UE and a base station and to prevent battery draining. A base station memory 642 and a UE memory 682 may store data and program codes for base station 610 and UE 615, respectively. A scheduler 644 may schedule UEs 615 for data transmission on the downlink and/or uplink.

In one configuration, base station 610 may include means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be base station controller/processor 640, base station memory 642, base station transmit processor 620, base station modulators/demodulators 632, and/or base station antennas 634 configured to perform the functions recited by the aforementioned means. In another aspect, the aforementioned means may be a module or any apparatus configured to perform the functions recited by the aforementioned means. In one configuration, UE 615 may include means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be UE controller/processor 680, UE memory 682, UE reception processor 658, UE MIMO detector 656, UE modulators/demodulators 654, and/or UE antennas 652 configured to perform the functions recited by the aforementioned means. In another aspect, the aforementioned means may be a module or any apparatus configured to perform the functions recited by the aforementioned means.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single components shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
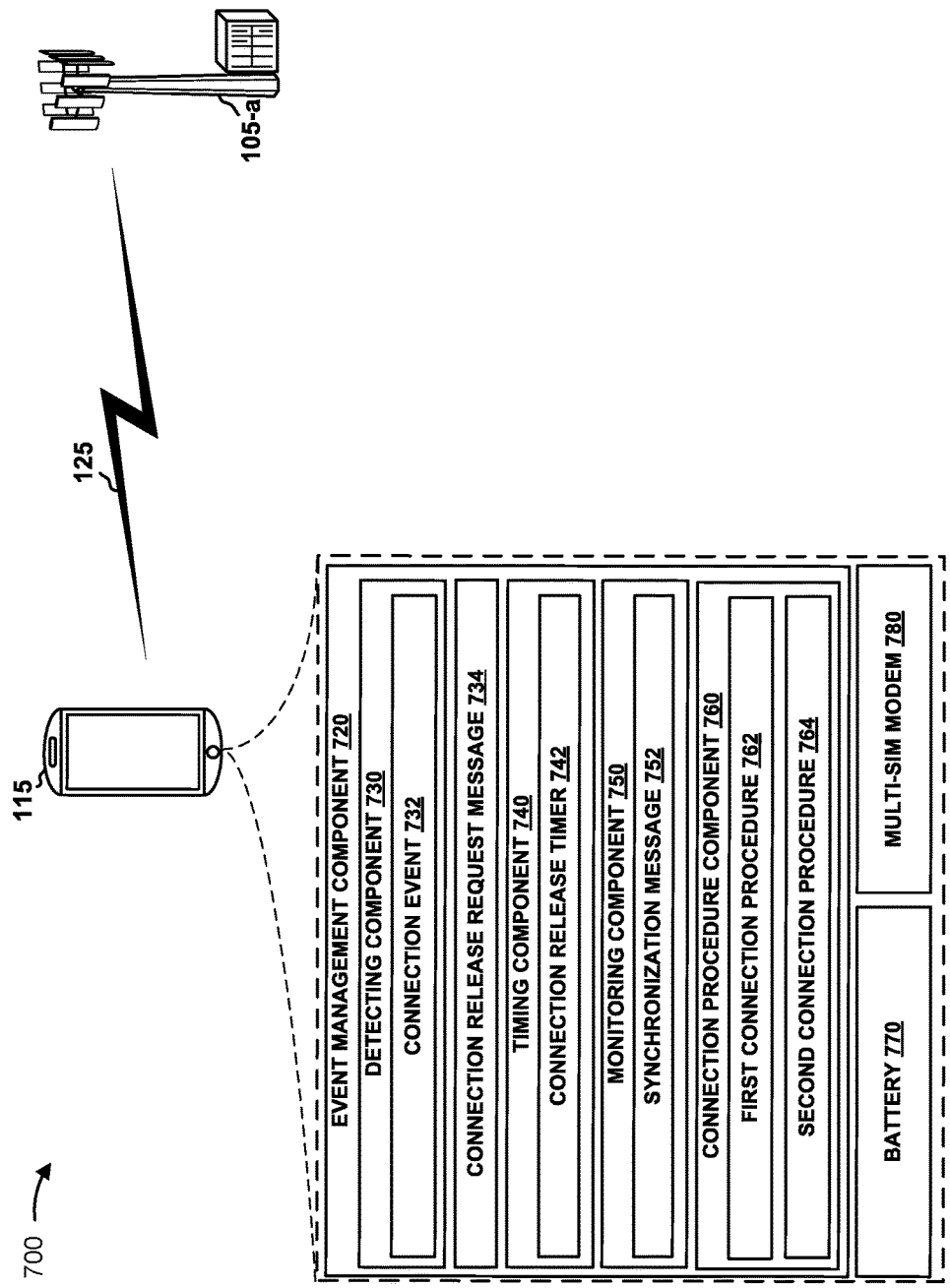
FIG. 7 is a block diagram of a wireless communication system including a UE having an event management component configured to performing at least one connection procedure to synchronize a UE and a base station during wireless communications in accordance with various aspects of the present disclosure.

Referring to FIG. 7, in an aspect, a wireless communications system 700 (which may be the same as or similar to wireless communications system 100 of FIG. 1 or the access network 200 of FIG. 2) includes at least one UE 115 in communication coverage of at least one base station 105-*a*. The base station 105-*a* (collectively referred to as Evolved Universal Mobile Telecommunications System (UMTS) Terrestrial Radio Access Network (E-UTRAN)) may interface with a core network (such as core network 130 of FIG. 1) through backhaul links 132 (e.g., 51 interface). In an aspect, UE 115 may include, a battery 770, one or more processors (not shown) and, optionally, memory (not shown), that may operate in combination with event management component 720 to performing a connection release procedure in order to synchronize UE 115 and base station 105-*a* and to prevent battery 770 draining. Moreover, UE 115 may include a multi-SIM modem 780, which may be configured to provide capabilities of Dual SIM, Dual Standby (DSDS) and Dual SIM, Dual Active (DSDA) on one or more RATs. The wireless communications between UE 115 and base station 105-*a* may include signals transmitted by either the base station 105-*a* or the UE 115 via communication link 125, respectively. For example, with respect to the communication between UE 115 and base station 105-*a*, wireless communications may include one or more downlink channels transmitted by base station 105-*a* to UE 115, and one or more uplink channels transmitted by UE 115 to base station 105-*a*.

In an aspect, UE 115 and/or event management component 720 includes detecting component 730, which may be configured to detect a connection event 732 after completing a RRC connection reconfiguration procedure with a base station 105-*a*. For example, the detection of the connection event 732 may occur at any time after UE 115 transmits ELS RRC Connection Reconfiguration Complete to base station 105-*a*. The transmission of the ELS RRC Connection Reconfiguration Complete occurs as a result of the base station 105-*a* receiving the information regarding the capability of ELS of UE 115 (e.g. due in part to the multi-SIM modem 780), which causes base station 105-*a* to modify the RRC Connection by transmitting an ELS RRC Connection Reconfiguration message to UE 115 in order to reconfigure UE 115 to communicate in ELS mode. As noted above, upon completion of the RRC reconfiguration procedure, UE 115 may transmit ELS RRC Connection Reconfiguration Complete to base station 105-*a*.

In an example, event management component 720 and/or detecting component 730 may detect the connection event 732 by detecting inactivity at a protocol layer for a defined time duration. In some instances, the protocol layer may correspond to a media access control (MAC) layer. In a further example, event management component 720 and/or detecting component 730 may detect packet data inactivity on one or more logical uplink or downlink channels at the MAC layer for the defined time duration. In another example, event management component 720 and/or detecting component 730 may detect the connection event 732 by detecting an initiation of a public local mobile network (PLMN) search procedure. As such, connection event 732 may correspond to inactivity such as a protocol layer inactivity or packet data inactivity in a logical UL or DL channel, or the start or initiation of a PLMN search procedure.

In an aspect, UE 115 and/or event management component 720 may operate controller/processor 680 and/or transmit processor 664 (FIG. 6) to transmit a connection release request message 734 on a SRB to the base station 105-*a* in response to detecting the connection event 732. For example, the SRB may correspond to at least an SRB0 or an SRB1.

In an aspect, UE 115 and/or event management component 720 may include timing component 740, which may be configured to initiate a connection release timer 742 in response to detecting the connection event 732. For example, event management component 720 and/or timing component 740 may initiate the connection release timer 742 concurrently with transmitting the connection release request message 734.

In an aspect, UE 115 and/or event management component 720 may include monitoring component 750, which may be configured to monitor for a synchronization message 752 from the base station 105-*a*. For example, event management component 720 and/or monitoring component 750 may coordinate with controller/processor 680 and/or reception processor 658 (FIG. 6) in order to monitor for the synchronization message 752. For instance, reception processor 658 may receive one or more signals via antennas $652_{1-r}$ and send them to controller/processor 680 and/or event management component 720, which in turn may execute monitoring component 750 to determine whether the one or more signals correspond to the synchronization message 752. In an instance, the synchronization message 752 may be received on at least one of an SRB0 or an SRB1.

In an aspect, UE 115 and/or event management component 720 may include connection procedure component 760, which may be configured to perform a first connection procedure 762 to synchronize with the base station 105-*a* based on receiving the synchronization message 752 from the base station 105-*a* prior to an expiration of the connection release timer 742. For example, the first connection procedure 762 may correspond to an RRC connection release procedure for synchronizing with the base station 105-*a* based at least on the synchronization message 752. Furthermore, the synchronization message 752 may include at least one of a connection status of the base station 105-*a* or an indication that specifies whether the UE 115 is to perform the first connection procedure 762. Furthermore, in an example, event management component 720 and/or connection procedure component 760 may perform a second connection procedure 764 based on not receiving the synchronization message 752 from the base station 105-*a* prior to the expiration of the connection release timer 742. In an example, the second connection procedure 764 may correspond to a local connection release procedure for synchronizing with the base station 105-*a*.

Figure 8:
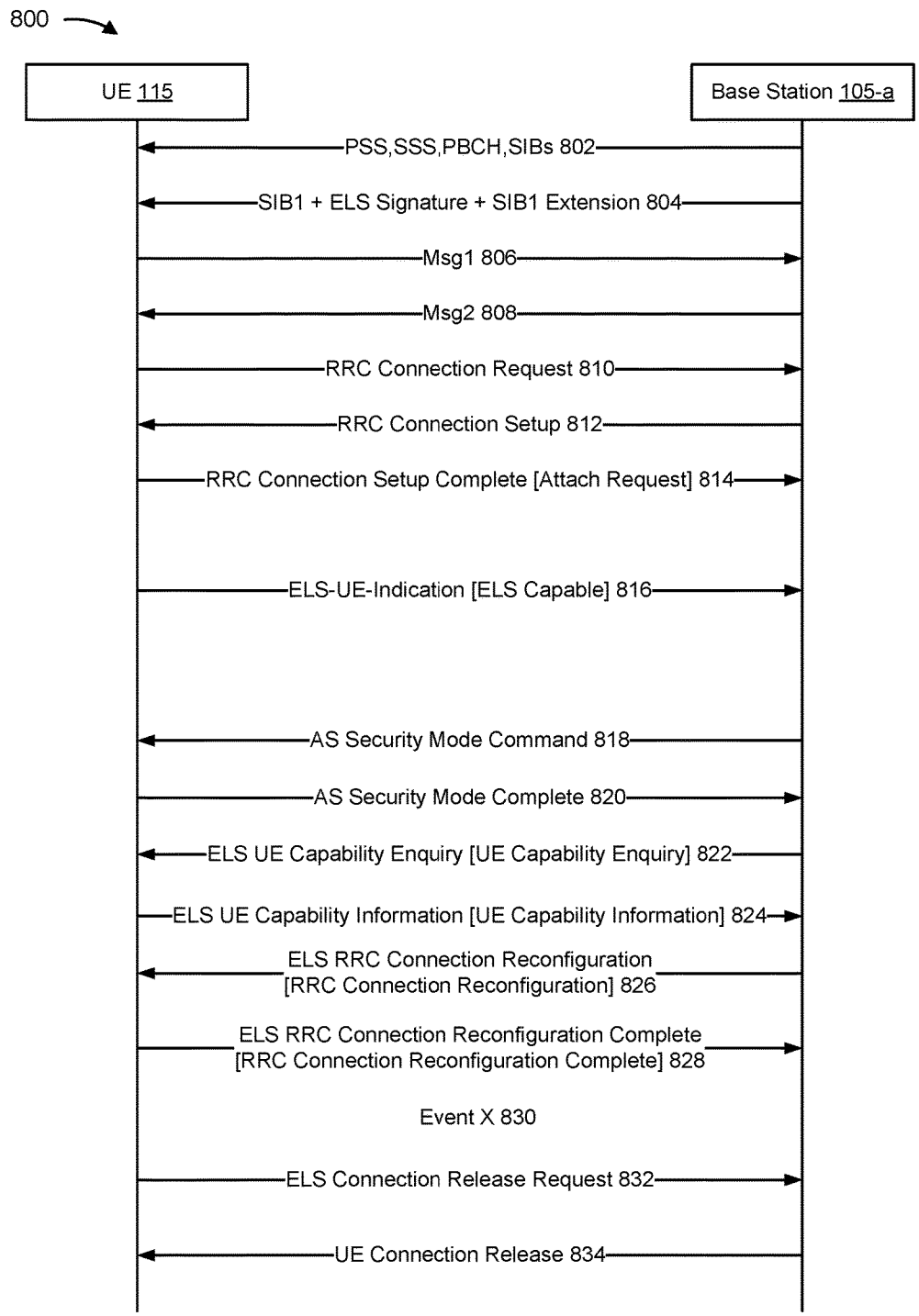
FIG. 8 is a call flow diagram of performing at least one connection procedure to synchronize a UE and a base station during wireless communications in accordance with various aspects of the present disclosure.

FIG. 8 illustrates a call flow 800 of a signaling call flow for performing at least one connection procedure to synchronize a UE and a base station during wireless communications. For example, in call flow 800, UE 115 may be configured to operate an event management component, such as event management component 720 (FIG. 7), and communicate with a base station, such as base station 105-*a*. As detailed below, a UE may be configured to monitor for a synchronization message from the base station, and performing a first connection procedure to synchronize with the base station based on receiving the synchronization message from the base station prior to an expiration of the connection release timer. As a result of performing the first connection procedure and synchronizing with the base station, the network may return from the idle state. Thus, the UE will not drain the battery by unnecessarily remaining in connection with an out-of-synchronization base station in idle state In an aspect, at 802, base station 105-a may transmit the primary synchronization signal (PSS), secondary synchronization signal (SSS), and at least one system information block (SIB) to UE 115. In an example, UE 115 may synchronize with the downlink channel by decoding the PSS and SSS signal. The UE 115 is synchronized to the downlink frames after completing this procedure.

At 804, base station 105-a transmits an SIB1, ELS signature, and ELS extension to UE 115.

At 806 and 808, base station 105-a may transmit two messages (e.g., Msg1 and Msg2) to UE 115.

At 810, UE 115 transmits an RRC Connection Request to base station 105-a. In an example, RRC Connection Request includes both the UE identity information and the call establishment cause (i.e. Mobile Originating Signaling or Emergency).

Assuming there are no issues corresponding to the RRC Connection Request, at 812 the base station 105-a responds by transmitting an RRC Connection Setup message. The procedure thus far has established a signaling bearer and a Dedicated Control Channel (DCCH).

Once in RRC Connected mode, at 814, UE 115 responds by transmitting an RRC Connection Setup Complete message which includes the Attach request for PDN connectivity. Although not shown in call flow 800, base station 105-a may forward the Attach request to a Mobility Management Entity (MME).

At 816, UE 115 may transmit an ELS-UE Indication to base station 105-a to indicate that UE 115 is ELS capable.

At 818, base station 105-a transmits an AS Security Mode Command to UE 115. The AS Security Mode Command is used to command the UE for the activation of AS security. For example, AS security comprises of the integrity protection of RRC signaling (SRBs) as well as the ciphering of RRC signaling (SRBs) and user plane data (DRBs).

At 820, UE 115 may transmit AS Security Mode Complete to base station 105-a once the AS security procedure is complete.

At 822, base station 105-a transmits an ELS UE Capability Enquiry and/or UE Capability Enquiry to UE 115 in order to enquire regarding the capabilities of UE 115.

At 824, UE 115 transmits ELS UE Capability Information and/or UE Capability Information to base station 105-a with the information regarding the capabilities of UE 115.

Upon receiving the information regarding the capability of ELS of UE 115, at 826, base station 105-a may modify the RRC Connection by transmitting an ELS RRC Connection Reconfiguration to UE 115 in order to reconfigure UE 115 to communicate in ELS mode.

Upon completion of the RRC reconfiguration procedure, at 828, UE 115 may transmit ELS RRC Connection Reconfiguration Complete to base station 105-a.

At 830, after the transmission of the ELS RRC Connection Reconfiguration Complete, UE 115 and/or event management component 720 (FIG. 7) may detect an Event X (e.g., connection event 732 (FIG. 7)).

As such, at 832, UE 115 and/or event management component 720 may perform a connection procedure by transmitting an ELS Connection Release Request to base station 105-a in order to synchronize UE 115 and base station 105-a. At 834, base station 105-a may transmit a UE Connection Release to UE 115 to command the release of the RRC connection. Thus, upon release of the RRC Connection, UE 115 is capable of reconnecting with base station 105-a or any other network, and therefore prevent battery drain by not remaining in the RRC Connected state with base station 105-a.

Figure 9:
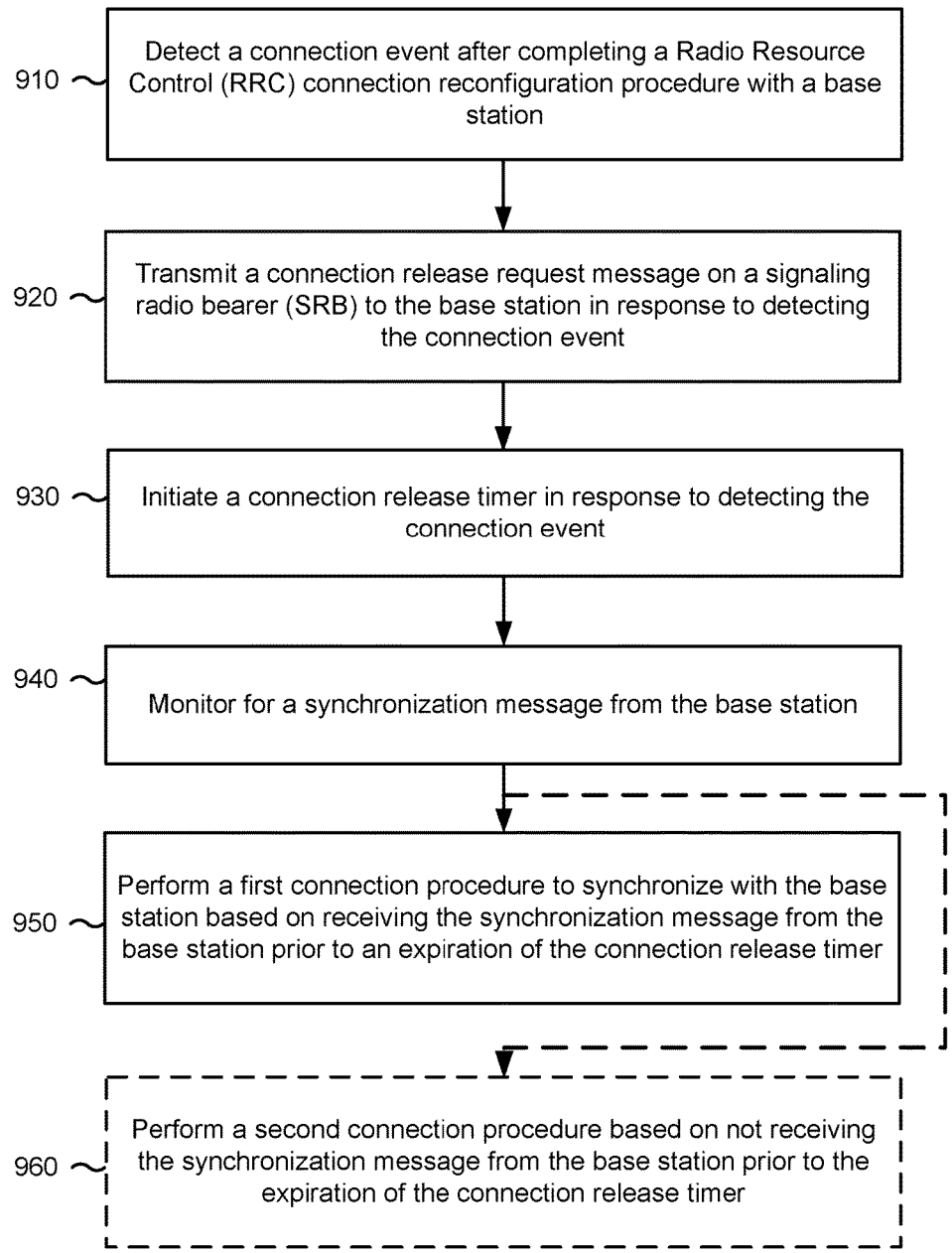
FIG. 9 is a flow chart illustrating an example method of performing at least one connection procedure to synchronize a UE and a base station during wireless communications, in accordance with various aspects of the present disclosure.

FIG. 9 is a flow diagram illustrating examples of methods related to performing at least one connection procedure to synchronize a UE and a base station during wireless communications with various aspects of the present disclosure. Although the operations described below are presented in a particular order and/or as being performed by an example component, it should be understood that the ordering of the actions and the components performing the actions may be varied, depending on the implementation. Also, although the event management component 720 is illustrated as having a number of subcomponents, it should be understood that one or more of the illustrated subcomponents may be separate from, but in communication with, the event management component 720, and/or each other. Moreover, it should be understood that any of actions or components described below with respect to the event management component 720 and/or its subcomponents may be performed by a specially-programmed processor, a processor executing specially-programmed software or computer-readable media, or by any other combination of a hardware component and/or a software component specially configured for performing the described actions or components.

In an aspect, at block 910, method 900 may include detecting a connection event after completing a RRC connection reconfiguration procedure with a base station. In an aspect, for example, UE 115 (FIG. 7) and/or processor 1104 (FIG. 11) may execute event management component 720 and/or detecting component 730 to detect a connection event 732 after completing a RRC connection reconfiguration procedure with a base station 105-a. In an example, event management component 720 and/or detecting component 730 may detect the connection event 732 by detecting inactivity at a protocol layer for a defined time duration. In some instances, the protocol layer may correspond to a MAC layer. In a further example, event management component 720 and/or detecting component 730 may detect packet data inactivity on one or more logical uplink or downlink channels at the MAC layer for the defined time duration. In another example, event management component 720 and/or detecting component 730 may detect the connection event 732 by detecting an initiation of a PLMN search procedure. In some instances, the RRC connection reconfiguration procedure may correspond to an ELS RRC connection reconfiguration procedure.

In an aspect, at block 920, method 900 may include transmitting a connection release request message on a SRB to the base station in response to detecting the connection event. In an aspect, for example, UE 115 (FIG. 7), including processor 1104 (FIG. 11), and/or event management component 720 may operate transmit processor 664 (FIG. 6) to transmit a connection release request message 734 on a SRB to the base station 105-a in response to detecting the connection event 732. For example, the SRB may correspond to at least an SRB0 or an SRB1.

In an aspect, at block 930, method 900 may include initiating a connection release timer in response to detecting the connection event. In an aspect, for example, UE 115 (FIG. 7) and/or processor 1104 (FIG. 11) may execute event management component 720 and/or timing component 740 to initiate a connection release timer 742 in response to detecting the connection event 732. In an instance, event management component 720 and/or timing component 740 may initiate the connection release timer 742 concurrently with transmitting the connection release request message 734.

In an aspect, at block 940, method 900 may include monitoring for a synchronization message from the base station. In an aspect, for example, UE 115 (FIG. 7) and/or processor 1104 (FIG. 11) may execute event management component 720 and/or monitoring component 750 to monitor for a synchronization message 752 from the base station 105-a. In an example, event management component 720 and/or monitoring component 750 may coordinate with reception processor 658 (FIG. 6) in order to monitor for the synchronization message 752. For instance, reception processor 658 may receive one or more signals via antennas $652_{1-r}$ and send them to controller/processor 680 and/or event management component 720, which in turn may execute monitoring component 750 to determine whether the one or more signals correspond to the synchronization message 752. In an instance, the synchronization message 752 may be received on at least one of an SRB0 or an SRB1.

In an aspect, at block 950, method 900 may include performing a first connection procedure to synchronize with the base station based on receiving the synchronization message from the base station prior to an expiration of the connection release timer. In an aspect, for example, UE 115 (FIG. 7) and/or processor 1104 (FIG. 11) may execute event management component 720 and/or connection procedure component 760 to perform a first connection procedure 762 to synchronize with the base station 105-a based on receiving the synchronization message 752 from the base station 105-a prior to an expiration of the connection release timer 742. In an example, the first connection procedure 762 may correspond to an RRC connection release procedure for synchronizing with the base station 105-a based at least on the synchronization message 752. Furthermore, the synchronization message 752 may include at least one of a connection status of the base station 105-a or an indication that specifies whether the UE 115 is to perform the first connection procedure 762.

In an aspect, at block 960, method 900 may optionally include performing a second connection procedure based on not receiving the synchronization message from the base station prior to the expiration of the connection release timer. In an aspect, for example, UE 115 (FIG. 7) and/or processor 1104 (FIG. 11) may execute event management component 720 and/or connection procedure component 760 to perform a second connection procedure 764 based on not receiving the synchronization message 752 from the base station 105-a prior to the expiration of the connection release timer 742. In an example, the second connection procedure 764 may correspond to a local connection release procedure for synchronizing with the base station 105-a.

Figure 10:
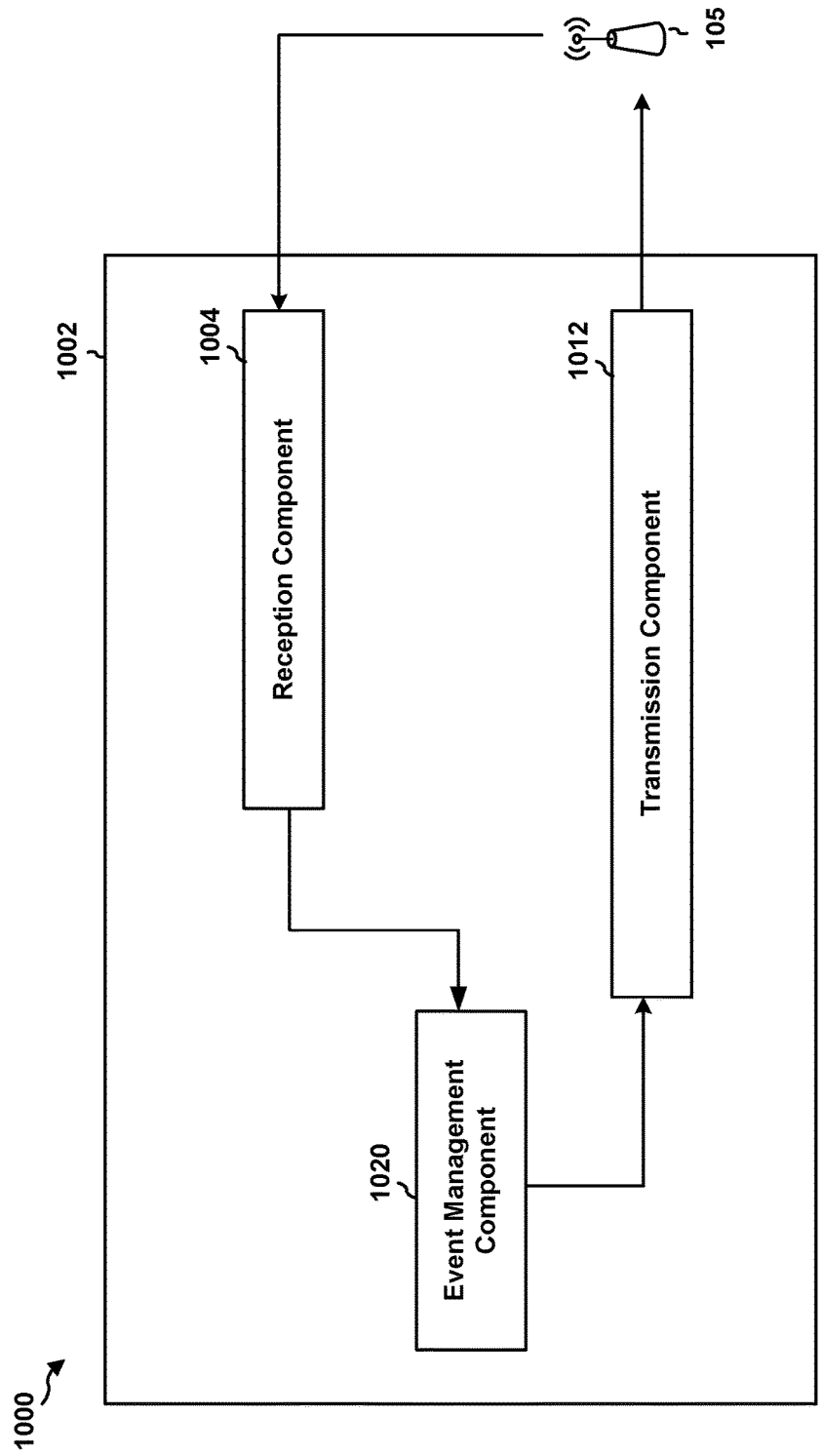
FIG. 10 is a flow diagram illustrating the data flow between different means/components in an exemplary apparatus including an event management component in accordance with various aspects of the present disclosure.

FIG. 10 is a conceptual data flow diagram 1000 illustrating the data flow between different means/components in an exemplary apparatus 1002 that includes event management component 1020, which may be the same as or similar to event management component 720. The apparatus 1002 may be a UE, which may include UE 115 of FIGS. 1 and 7. The apparatus 1002 includes reception component 1004 that, in an aspect, receives information used by apparatus 1002 and/or event management component 1020 to detect a connection event after completing a RRC connection reconfiguration procedure with a base station. The apparatus 1002 includes a transmission component 1012 that may transmit a connection release request message on a SRB to the base station in response to detecting the connection event. In an aspect, the event management component 1020 may initiate a connection release timer in response to detecting the connection event, monitor for a synchronization message from the base station, and perform a first connection procedure to synchronize with the base station based on receiving the synchronization message from the base station prior to an expiration of the connection release timer.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
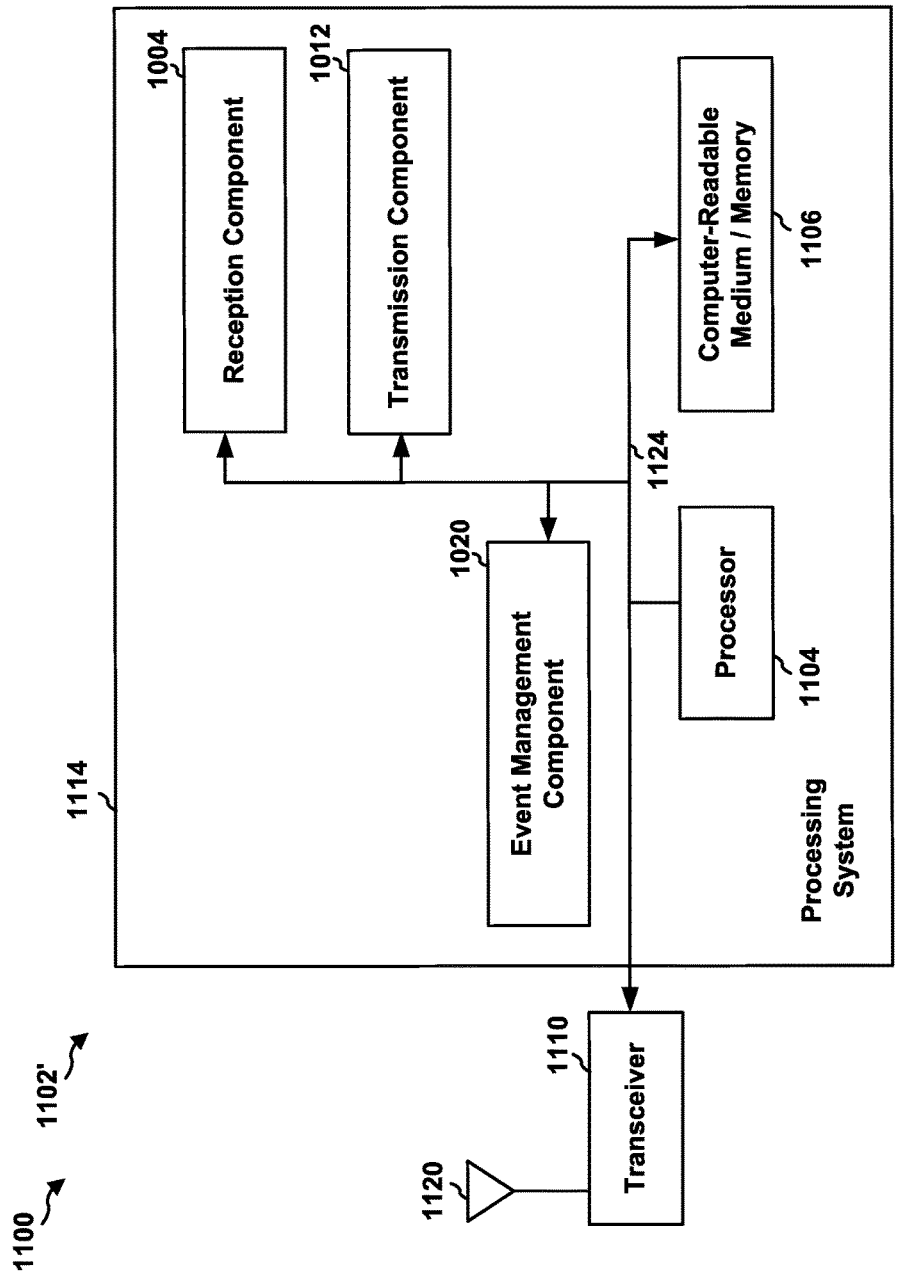
FIG. 11 is a block diagram illustrating an example of a hardware implementation for an apparatus employing a processing system including an event management component in accordance with various aspects of the present disclosure.

FIG. 11 is a diagram 1100 illustrating an example of a hardware implementation for an apparatus 1102' employing a processing system 1114 that includes power saving component 1020 (FIG. 10), which may be the same as or similar to event management component 720. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1012, 1020, and 1110, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1620, extracts information from the received signal, and provides the extracted information to the processing system 1114, specifically the reception component 1004. In addition, the transceiver 1110 receives information from the processing system 1114, specifically the transmission component 1012, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. For example, processor 1104 coupled to the memory 1106 may be configured to detect a connection event after completing a RRC connection reconfiguration procedure with a base station, transmit a connection release request message on a SRB to the base station in response to detecting the connection event, initiate a connection release timer in response to detecting the connection event, monitor for a synchronization message from the base station, and perform a first connection procedure to synchronize with the base station based on receiving the synchronization message from the base station prior to an expiration of the connection release timer. The computer-readable medium/memory 1106 may also be used for storing data that is manipulated by the processor 1104 when executing software. The processing system 1114 further includes at least one of the components 1004, 1012, and 1020. The components may be software components running in the processor 1104, resident/stored in the computer readable medium/memory 1106, one or more hardware components coupled to the processor 1104, or some combination thereof.

In one configuration, the apparatus 1102/1102' for wireless communication includes means for detecting a connection event after completing a RRC connection reconfiguration procedure with a base station. The apparatus includes means for transmitting a connection release request message on a SRB to the base station in response to detecting the connection event. The apparatus includes means for initiating a connection release timer in response to detecting the connection event. The apparatus includes means for monitoring for a synchronization message from the base station. The apparatus includes means for performing a first connection procedure to synchronize with the base station based on receiving the synchronization message from the base station prior to an expiration of the connection release timer.

The aforementioned means may be one or more of the aforementioned components of the apparatus 1102 and/or the processing system 1114 of the apparatus 1102' configured to perform the functions recited by the aforementioned means. As described supra, the processing system 1114 may include the TX Processor 664, the RX Processor 658, and the controller/processor 680. As such, in one configuration, the aforementioned means may be the TX Processor 664, the RX Processor 658, and the controller/processor 680 configured to perform the functions recited by the aforementioned means.

Techniques described herein may dynamically determine whether to enable or disable a power saving feature for an application based at least in part on measuring performance of the application and/or the UE with the power saving feature enabled and disabled. In this way, the UE may configure whether to enable or disable a power saving feature for an application, thereby increasing application and UE performance and reducing application and UE power consumption.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover: a; b; c; a and b; a and c; b and c; and a, b and c.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of wireless communication at a user equipment (UE), comprising:
    detecting a connection event after completing an Extended Long Term Evolution (LTE) Signaling (ELS) Radio Resource Control (RRC) connection reconfiguration procedure with a base station, wherein completing the ELS RRC connection reconfiguration procedure includes transmitting an ELS RRC connection reconfiguration complete message to the base station corresponding to the UE operating in ELS mode;
    transmitting a connection release request message on a signaling radio bearer (SRB) to the base station in response to detecting the connection event;
    initiating a connection release timer in response to detecting the connection event;
    monitoring for a synchronization message from the base station, wherein the synchronization message includes at least one of a connection status of the base station; and
    performing a first connection procedure to synchronize with the base station based on receiving the synchronization message from the base station prior to an expiration of the connection release timer, wherein the first connection procedure corresponds to an RRC connection release procedure for synchronizing with the base station based at least on the synchronization message.

2. The method of claim 1, further comprising performing a second connection procedure based on not receiving the synchronization message from the base station prior to the expiration of the connection release timer.

3. The method of claim 2, wherein the second connection procedure corresponds to a local connection release procedure for synchronizing with the base station.

4. The method of claim 1, wherein the synchronization message includes an indication that specifies whether the UE is to perform the first connection procedure.

5. The method of claim 1, wherein the synchronization message is received on at least one of an SRB0 or an SRB1.

6. The method of claim 1, wherein detecting the connection event includes detecting inactivity at a protocol layer for a defined time duration.

7. The method of claim 6, wherein the protocol layer corresponds to a Media Access Control (MAC) layer.

8. The method of claim 7, wherein detecting the inactivity includes detecting packet data inactivity on one or more logical uplink or downlink channels at the MAC layer for the defined time duration.

9. The method of claim 1, wherein detecting the connection event includes detecting an initiation of a public local mobile network (PLMN) search procedure.

10. The method of claim 1, wherein initiating the connection release timer includes initiating the connection release timer concurrently with transmitting the connection release message.

11. The method of claim 1, wherein the SRB corresponds to at least an SRB0 or an SRB1.

12. The method of claim 1, wherein the base station corresponds to an evolved Node B.

13. The method of claim 1, wherein the UE includes at least a multi-subscriber identity module (SIM) modem entity or a single SIM entity.

14. An apparatus for wireless communications, comprising:
a memory; and
a processor coupled to the memory and configured to:
detect a connection event after completing an Extended Long Term Evolution (LTE) Signaling (ELS) Radio Resource Control (RRC) connection reconfiguration procedure with a base station, wherein completing the ELS RRC connection reconfiguration procedure includes transmitting an ELS RRC connection reconfiguration complete message to the base station corresponding to the UE operating in ELS mode;
transmit a connection release request message on a signaling radio bearer (SRB) to the base station in response to detecting the connection event;
initiate a connection release timer in response to detecting the connection event;
monitor for a synchronization message from the base station, wherein the synchronization message includes at least one of a connection status of the base station; and
perform a first connection procedure to synchronize with the base station based on receiving the synchronization message from the base station prior to an expiration of the connection release timer, wherein the first connection procedure corresponds to an RRC connection release procedure for synchronizing with the base station based at least on the synchronization message.

15. The apparatus of claim 14, wherein the processor is further configured to perform a second connection procedure based on not receiving the synchronization message from the base station prior to the expiration of the connection release timer.

16. The apparatus of claim 15, wherein the second connection procedure corresponds to a local connection release procedure for synchronizing with the base station.

17. The apparatus of claim 14, wherein the synchronization message includes an indication that specifies whether the UE is to perform the first connection procedure.

18. The apparatus of claim 14, wherein the synchronization message is received on at least one of an SRB0 or an SRB1.

19. The apparatus of claim 14, wherein the processor configured to detect the connection event is further configured to detect inactivity at a protocol layer for a defined time duration.

20. The apparatus of claim 19, wherein the protocol layer corresponds to a Media Access Control (MAC) layer.

21. The apparatus of claim 20, wherein the processor configured to detect the inactivity is further configured to detect packet data inactivity on one or more logical uplink or downlink channels at the MAC layer for the defined time duration.

22. The apparatus of claim 14, wherein the processor configured to detect the connection event is further configured to detect an initiation of a public local mobile network (PLMN) search procedure.

23. The apparatus of claim 14, wherein the processor configured to initiate the connection release timer is further configured to initiate the connection release timer concurrently with transmitting the connection release message.

24. The apparatus of claim 14, wherein the SRB corresponds to at least an SRB0 or an SRB1.

25. A non-transitory computer-readable medium storing computer executable code for wireless communications, comprising:
code for detecting a connection event after completing an Extended Long Term Evolution (LTE) Signaling (ELS) Radio Resource Control (RRC) connection reconfiguration procedure with a base station, wherein completing the ELS RRC connection reconfiguration procedure includes transmitting an ELS RRC connection reconfiguration complete message to the base station corresponding to the UE operating in ELS mode;
code for transmitting a connection release request message on a signaling radio bearer (SRB) to the base station in response to detecting the connection event;
code for initiating a connection release timer in response to detecting the connection event;
code for monitoring for a synchronization message from the base station, wherein the synchronization message includes at least one of a connection status of the base station; and
code for performing a first connection procedure to synchronize with the base station based on receiving the synchronization message from the base station prior to an expiration of the connection release timer, wherein the first connection procedure corresponds to an RRC connection release procedure for synchronizing with the base station based at least on the synchronization message.

26. An apparatus for wireless communications, comprising:
a processor configured with:
means for detecting a connection event after completing an Extended Long Term Evolution (LTE) Signaling (ELS) Radio Resource Control (RRC) connection reconfiguration procedure with a base station, wherein completing the ELS RRC connection reconfiguration procedure includes transmitting an ELS RRC connection reconfiguration complete message to the base station corresponding to the UE operating in ELS mode;
means for transmitting a connection release request message on a signaling radio bearer (SRB) to the base station in response to detecting the connection event;
means for initiating a connection release timer in response to detecting the connection event;

means for monitoring for a synchronization message from the base station, wherein the synchronization message includes at least one of a connection status of the base station; and means for performing a first connection procedure to synchronize with the base station based on receiving the synchronization message from the base station prior to an expiration of the connection release timer, wherein the first connection procedure corresponds to an RRC connection release procedure for synchronizing with the base station based at least on the synchronization message.

27. The method of claim 1, wherein operating in ELS mode corresponds to a hand shake signaling mechanism in that the base station indicates a special signature included with system information block (SIB) padding information.

28. The method of claim 1, wherein operating in ELS mode includes operating in ELS mode using a multi-subscriber identity module (MSIM) modem.

29. The apparatus of claim 14, wherein operating in ELS mode corresponds to a hand shake signaling mechanism in that the base station indicates a special signature included with system information block (SIB) padding information.

30. The apparatus of claim 14, wherein operating in ELS mode includes operating in ELS mode using a multi-subscriber identity module (MSIM) modem.

* * * * *